United States Patent
Dority

(10) Patent No.: US 11,927,600 B2
(45) Date of Patent: Mar. 12, 2024

(54) FLUIDIC BRIDGE DEVICE AND SAMPLE PROCESSING METHODS

(71) Applicant: Cepheid, Sunnyvale, CA (US)

(72) Inventor: Douglas B. Dority, Santa Cruz, CA (US)

(73) Assignee: Cepheid, Sunnyvale, CA (US)

( * ) Notice: Subject to any disclaimer, the term of this patent is extended or adjusted under 35 U.S.C. 154(b) by 739 days.

(21) Appl. No.: 15/718,840

(22) Filed: Sep. 28, 2017

(65) Prior Publication Data
US 2018/0031592 A1 Feb. 1, 2018

Related U.S. Application Data

(63) Continuation of application No. PCT/US2016/025748, filed on Apr. 1, 2016.

(60) Provisional application No. 62/142,063, filed on Apr. 2, 2015.

(51) Int. Cl.
*B01L 3/00* (2006.01)
*G01N 35/10* (2006.01)
*G01N 35/00* (2006.01)

(52) U.S. Cl.
CPC .......... *G01N 35/1095* (2013.01); *B01L 3/502* (2013.01); *B01L 3/502715* (2013.01);
(Continued)

(58) Field of Classification Search
CPC .. B01L 3/56; B01L 3/561; B01L 3/563; B01L 2200/026; B01L 2200/027;
(Continued)

(56) References Cited

U.S. PATENT DOCUMENTS 3,915,652 A * 10/1975 Natelson ............ G01N 35/1097
422/65
5,779,868 A * 7/1998 Parce ...................... F04B 17/00
204/604
(Continued)

FOREIGN PATENT DOCUMENTS

JP 2004-508542 A 3/2004

OTHER PUBLICATIONS

International Search Report in PCT/US2016/025748, dated Jul. 6, 2016.

*Primary Examiner* — Jill A Warden
*Assistant Examiner* — Dwayne K Handy
(74) *Attorney, Agent, or Firm* — Kilpatrick Townsend & Stockton LLP

(57) ABSTRACT

A fluidic bridge device for transport of a fluid sample between a first sample processing device and a second sample processing device. The fluidic bridge may include one or more fluid channels extending between fluid-tight couplings attachable to transfer ports of the first and second sample processing device. In one aspect the first device is a sample preparation device and the second device is an assay device. The fluidic bridge can include at least two fluid conduits, at least one for transport of the prepared sample, and at least one other to facilitate displacement of air to allow flow of the prepared sample through the other fluid conduit. The fluid channels can include one or more of an amplification chamber, a processing chamber, a gas-permeable vent, a bubble trap, a filter, and an external port. Methods of preparing and transporting a fluid sample between devices are provided herein.

14 Claims, 11 Drawing Sheets

(52) U.S. Cl.
CPC ............... *B01L 3/561* (2013.01); *B01L 3/563* (2013.01); *G01N 35/10* (2013.01); *B01L 2200/026* (2013.01); *G01N 2035/00326* (2013.01)

(58) Field of Classification Search
CPC ..... G01N 35/10; G01N 35/1095; F16L 19/18; F16L 19/19; F16L 19/20; F16L 9/18; F16L 9/19; F16L 9/20
See application file for complete search history.

(56) References Cited

U.S. PATENT DOCUMENTS

| | | | |
|---|---|---|---|
| 5,827,441 A * | 10/1998 | Solbjorg | F16L 3/223 249/91 |
| 6,110,674 A | 8/2000 | Nivens | |
| 6,319,476 B1 * | 11/2001 | Victor, Jr. | F15C 5/00 422/502 |
| 6,374,684 B1 | 4/2002 | Dority | |
| 6,485,690 B1 * | 11/2002 | Pfost | B01J 19/0046 422/552 |
| 7,311,882 B1 * | 12/2007 | Renzi | B01L 3/565 285/120.1 |
| 2002/0124896 A1 | 9/2002 | O'Connor et al. | |
| 2004/0164010 A1 | 8/2004 | Bayer et al. | |
| 2004/0202581 A1 | 10/2004 | Berndt | |
| 2008/0124242 A1 * | 5/2008 | Kawazoe | B01L 3/502715 422/50 |
| 2011/0120576 A1 * | 5/2011 | Sigouin | G01M 3/04 137/551 |
| 2013/0113206 A1 * | 5/2013 | Irwin | F16L 9/20 285/125.1 |
| 2014/0098252 A1 | 4/2014 | Chang | |
| 2014/0206074 A1 | 7/2014 | Peterson | |

\* cited by examiner

FLUIDIC BRIDGE DEVICE AND SAMPLE PROCESSING METHODS

CROSS-REFERENCES TO RELATED APPLICATIONS

This application is a Continuation of PCT/US2016/025748, filed Apr. 1, 2016, which claims the benefit of priority to U.S. Provisional Application No. 62/142,063, filed Apr. 2, 2015, the entire contents of each are incorporated herein by reference.

This application is generally related to U.S. Pat. No. 6,374,684 entitled "Fluid Control and Processing System," filed Aug. 25, 2000; and U.S. Pat. No. 8,048,386 entitled "Fluid Processing and Control," filed Feb. 25, 2002, each of which the entire contents are incorporated herein by reference for all purposes.

BACKGROUND OF THE INVENTION

The present invention relates generally to fluid manipulation and, more particularly, to a device, system and method for transporting a fluid sample between sample processing devices.

The analysis of fluids such as clinical or environmental fluids generally involves a series of processing steps, which can include chemical, optical, electrical, mechanical, thermal, or acoustical processing of the fluid samples. Whether incorporated into a bench-top instrument, a portable analyzer, a disposable cartridge, or a combination thereof, such processing typically involves complex fluidic assemblies and processing algorithms.

Conventional systems for processing fluid samples employ a series of regions or chambers each configured for subjecting the fluid sample to a specific processing step. As the fluid sample flows through the system sequentially from region or chamber to a subsequent region or chamber, the fluid sample undergoes the processing steps according to a specific protocol. Because different protocols require different configurations, conventional systems employing such sequential processing arrangements are not versatile or easily adaptable to different protocols or processing and analysis systems. A single device may not provide the functionality needed to perform all the processing steps that analysis of a sample may require. As a result, a user may need to utilize different devices in processing a sample.

BRIEF SUMMARY OF THE INVENTION

The present invention provides an apparatus, system and method for manipulating fluid samples, in particular, for transporting a fluid sample between a first and a second sample processing device. In some aspects of the invention, the first sample processing device relates to sample preparation and the second sample processing device relates to analysis of the prepared sample and/or further processing of the sample.

Some embodiments of the invention include methods, systems and devices that facilitate transport of a fluid sample prepared, at least in part, by a first sample processing device to a second sample processing device for further processing or analysis, such as detection of a target within the fluid sample. In some aspects, the invention provides a fluidic bridge device through which the prepared sample can be transported from the sample preparation device to the processing and/or analysis device. In some embodiments, the fluidic bridge is an elongate member having one or more fluid flow conduits extending between fluid-tight couplings on opposing ends of the bridge. The fluid-tight couplings are adapted for coupling with each of the first and second sample processing devices at a fluid tight junction so as to fluidly couple the first and second processing devices.

In some embodiments, the first sample processing device is a sample preparation apparatus that employs a rotary valve configuration to control fluidic movement within a cartridge that allows fluidic communication between a fluid sample processing region selectively with a plurality of chambers in the cartridge. Non-limiting exemplary chambers can include, a sample chamber, a reagent chamber, a waste chamber, a wash chamber, a lysate chamber, an amplification chamber, and a reaction chamber. The fluid flow among the fluid sample processing region and the chambers is controlled by adjusting the position of the rotary valve. In this way, the metering and distribution of fluids in the apparatus can be varied depending on the specific protocol, which allows sample preparation to be adaptable to different protocols such as may be associated with a sample or different types of samples. For example, the first sample processing apparatus can include a means for cell lysis, e.g., a sonication means so that bacteria and cells in a fluid sample to be analyzed can be lysed. Additional lysis means suitable for use with the instant invention are well known to persons of skill in the art, and can include, chemical lysis, mechanical lysis, and thermal lysis. In some embodiments, the sample includes bacteria, eukaryotic cells, prokaryotic cells, or viral particles. One advantage of the cartridge of the present invention is that it allows the intracellular material from a relatively large volume of fluid sample, e.g. several milliliters or more, to be separated from the sample and concentrated into a much smaller volume of reaction fluid, e.g., 100 µL or less. The cartridge permits extraordinary concentration factors by efficiently extracting material from milliliter quantities of fluid sample. In particular, the sample chamber preferably has a volume capacity in the range of 100 µl to 12 ml. More preferably, the sample chamber has a volume capacity of at least 1 ml. The lower limit of 1 ml is preferred because at least 1 ml of sample should be analyzed to detect low concentration analytes such as nucleic acid. The upper limit of 12 ml is preferred because a sample volume greater than 12 ml would require a much larger cartridge and likely clog the filter stack. In the presently preferred embodiment, the sample chamber has a volume capacity of 5.5 ml for holding 5 ml of sample.

In one aspect, sample processing comprises sample processing steps that are performed from initial sample preparation steps, intermediate processing steps, and/or further processing steps to facilitate a final reaction for detection of a target analyte in the fluid sample. For example, sample processing can include preliminary preparation steps, such as filtering, grinding, mincing, concentrating, trapping debris or purifying a rough sample, or steps for fragmenting of DNA or RNA of the target analyte, such as by sonication or other mechanical or chemical means. Sample processing may include various intermediate processing steps, such as filtering, amplification, or further processing of nucleic acids in the sample, including but not limited to bisulfite treatment, reverse transcription, or fragmentation of DNA or RNA. Sample processing may further include final processing and analyte detection steps, such as final amplification, filtering and mixing with reagents for a reaction to detect the target analyte, which detection can include optical, chemical and/or electrical detection. In some embodiments, the first sample processing device is configured to perform initial and/or intermediate processing steps, while the second sample processing device is configured to perform intermediate and/or final processing, such as any of those described herein or as would be known to one of skill in the art of target analyte detection. In some embodiments, the first sample processing device is configured to perform at least a first step in the overall sample processing and transport of the fluid sample to the second sample processing device to perform at least a subsequent step in the process, which can include detection of the target analyte. In another embodiment, the fluid sample can be transported from the second sample processing device back to the first sample processing device for additional processing and detection of analytes.

In some embodiments, the first sample processing device can be a fluid control and processing system for controlling fluid flow among a plurality of chambers within a cartridge, the cartridge comprising a housing including a valve body having a fluid sample processing region continuously coupled fluidicly with a fluid displacement chamber. The fluid displacement chamber is depressurizable to draw fluid into the fluid displacement chamber and pressurizable to expel fluid from the fluid displacement chamber. The fluid sample processing region includes a plurality of fluid processing ports each fluidically coupled with one of a plurality of external ports of the valve body. The fluid displacement chamber is fluidicly coupled with at least one of the external ports. The valve body is adjustable with respect to the plurality of chambers within the housing to allow the external ports to be placed selectively in fluidic communication with the plurality of chambers. In some embodiments, the valve body is adjustable with respect to the housing comprising the plurality of chambers, to place one external port at a time in fluidic communication with one of the plurality of chambers.

In some embodiments of the cartridge, the fluid sample processing region can be disposed between the fluid displacement chamber and at least one fluid port. The term "fluid processing region" refers to a region in which a fluid is subject to processing including, without limitation, chemical, optical, electrical, mechanical, thermal, or acoustical processing. For example, chemical processing may include a catalyst; optical processing may include UV activation; electrical processing may include electroporation or electrophoresis or isoelectric focusing; mechanical processing may include mixing, filtering, pressurization, and cell disruption; thermal processing may include heating or cooling; and acoustical processing may include the use of ultrasound. In some embodiments, the fluid processing region may include an active member, such as a filter, to facilitate processing of the fluid. Non-limiting exemplary active members that are suitable for use with the instant invention include a microfluidic chip, a solid phase material, a filter or a filter stack, an affinity matrix, a magnetic separation matrix, a size exclusion column, a capillary tube, or the like. Suitable solid phase materials include, without limitation, beads, fibers, membranes, filter paper, lysis paper impregnated with a lysing agent, glass wool, polymers, or gels. In some embodiments, the fluid processing region is used to prepare a sample for further processing, for instance, in a second fluid processing device fluidly coupled with the first fluid sample processing device through the fluidic bridge. Additional active members suitable for use with the instant invention are well known to persons of skill in the art. In some embodiments, an energy transmitting member is operatively coupled with the fluid sample processing region for transmitting energy thereto to process fluid contained therein. In some embodiments, the valve body includes a crossover channel, and the valve body is adjustable with respect to the plurality of chambers to place the crossover channel in fluidic communication with two of the chambers concurrently. The cartridge housing can include one or more branches that extend to one or more transfer ports to which a reaction vessel can be attached so as to facilitate transfer of fluid sample from a chamber of the cartridge into the reaction vessel. In some embodiments, the reaction vessel extends from the housing of the cartridge. These aspects can be understood further by referring to U.S. Pat. No. 8,048,386. It is understood that in some embodiments, fluid may flow in either direction into or out of the transfer ports such that fluid flow is not limited in any particular direction. For example, in an embodiment having a pair of transfer ports, air may be pumped into or evacuated from one of the pair of transfer ports to facilitate flow of the fluid sample into a conduit of the reaction vessel through the transfer port.

In some embodiments, the fluidic bridge includes an elongated bridge having one or more fluid channels extending between one or more fluid-tight couplings on opposing ends of the elongate bridge. The one or more fluid-tight couplings on a first end of the elongated bridge are adapted for coupling with a first sample processing device at a fluid tight junction, the one or more fluid-tight couplings on a second end of the elongate bridge opposite the first end adapted for coupling with a second sample processing device. In some embodiments, the one or more fluid-tight coupling on the first end are included within a fluid interface adapted to couple with one or more transfer ports of a sample processing cartridge of the first sample processing device that are also suited for coupling with a reaction vessel, such as that described above, thereby allowing a particular configuration of sample cartridge to be used with either a reaction vessel or the fluidic bridge. In some embodiments, the fluidic bridge includes an elongated bridge having one or more fluid channels not including a sample preparation chamber. The elongated bridge can be defined by a planar frame supporting the one or more fluid-tight couplings on each end. In one aspect, the planar frame comprises a material sufficiently stiff so as to support the bridge when attached to the first sample processing device at one end. The fluidic bridge may be formed of a polymer-based material or any suitable material for transporting a fluid sample.

In some embodiments, the one or more fluid channels have a cross-sectional lumen area that does not substantially vary across the length of the fluid channel between respective fluid-tight couplings at the opposing ends of the fluidic bridge. The cross-sectional area of each of the one or more fluid channels remains a substantially constant size and shape between respective fluid-tight couplings. In some embodiments, the one or more fluid channels include two spaced apart fluid channels that are spaced apart and dimensioned so as to be fittingly received within two corresponding transfer ports in a sample processing cartridge housing. In some embodiments, the bridge can include a supporting web structure separating the at least two channels. In some embodiments, the bridge can be configured so that the volume of each of the at least two channels between the first and second ends, does not substantially differ. In some embodiments, the bridge can be configured so that the volume of at least one of the at least two channels has a substantially different volume between the first and second ends of the fluidic bridge.

In some embodiments, the one or more fluid channels can be adapted without a sample preparation region within the fluidic bridge, meaning that the fluid channels do not include a portion configured for initial sample preparation steps, such as initial filtering of debris from the fluid sample, initial mixing with reagents, and/or initial fragmentation of the DNA of the target analyte, such as a sonication chamber or sharp edges adapted for adapted for breaking or fragmenting cells or DNA strands. In some embodiments, the one or more fluid channels can include one or more regions adapted for providing controlled flow of the fluid sample, such as may be used for transitive storage or collection of the fluid sample, which can be useful for mixing, amplification or to facilitate control of the temperature of the fluid sample.

In some aspects, the fluid-tight couplings at the first end of the bridge comprise a stub dimensioned to be fittingly received within one or more corresponding ports in the first sample processing device so as to fluidly couple the one or more channels with the first sample processing device. The stubs can be dimensioned to be fluidly coupled by a friction fit within the corresponding ports in the first sample processing device, or a cartridge housing that is inserted into the first sample processing device. In some embodiments, the bridge comprises at least two fluid channels fed by two inlet stubs at the first end of the bridge that are fittingly received within at least two transfer ports on the cartridge housing. The fluid-tight couplings at the second end can also include stubs dimensioned to be fittingly received within one or more corresponding ports in the second sample processing device or can interface with an adapter to facilitate fluidic coupling with the second device. In some embodiments, the second device can be a container or receptacle.

In some embodiments, the fluidic bridge includes a flange from which the inlet stubs extend, the flange being engageable with a retaining member of the first sample processing device so as to maintain the fluid tight coupling and position of the fluidic bridge when coupled to the first sample processing device or cartridge that is inserted into the first sample processing device. The first sample processing device or cartridge can also include a gasket surrounding the plurality of transfer ports, the gasket being of a formable material, such as an elastomeric material, so that when the inlet portions of the first end of the fluidic bridge are fluidly coupled with the at least two transfer ports the gasket member engages a proximal facing surface of the flange so as to ensure a fluid-tight coupling. The distal end of the fluidic bridge can be of a similar or identical structure so as to form fluid-tight couplings with similar transfer ports of a second processing device, or alternatively, the distal end can be configured differently for attachment to various differing devices. In some embodiments, the fluid tight couplings at opposite ends of the fluidic bridge are substantially similar or identical and the first and/or second sample processing device can include one or more adapters or attachments that facilitate attachment of the distal end of the fluidic bridge to various differing sample processing devices.

In some embodiments, the fluidic bridge can include one or more features for further processing of the fluid sample during transport there through. In some embodiments, the fluidic bridge can include at least one processing region in fluid communication with at least one of the fluid channels, wherein the processing region is not a sample preparation chamber. In some embodiments, at least a portion of the fluidic bridge is at least partly translucent or transparent so as to allow optical detection/interrogation of fluid transported through the one or more fluid channels or to allow confirmation that the fluid sample is passing through the bridge by visual observation. In some embodiments, the bridge can include one or more features that can provide an additional process step, for example, a chamber for chemical treatment, such as bisulfite treatment, a pre-amplification chamber or filter, or features that facilitate passage of the fluid sample through the bridge, for example, a gas permeable vent or a bubble trap.

In some embodiments, the fluidic bridge is formed, entirely or partly, of an opaque material or includes an opaque coating on all or part of the device. This aspect may serve to protect the device, or at least an interior of a portion of a fluid conduit therein, from ambient light. In some embodiments, the fluidic bridge is substantially opaque and includes a window portion that is transparent or semi-transparent so as to allow optical detection in a select portion of the device.

In some embodiments of the invention, the fluidic bridge is of sufficient length and dimension that when coupled with a cartridge mounted within a cartridge receiver of a first sample processing device having a passageway, the elongated bridge extends through the passageway and outside of the cartridge receiver of the first sample processing device to facilitate transport of the prepared sample from the cartridge to a second sample processing device positioned near the first sample processing device. In some embodiments, the fluidic bridge includes a planar frame supporting and defining the one or more channels. The planar frame comprises a sufficiently stiff material, typically a polymer-based material, so as to support the one or more fluidic channels so that the bridge extends outside of the cartridge receiver so that a user can readily attach the opposite end of the bridge to a desired second fluid sample processing device. This configuration allows various differing types of devices to be used for the second sample processing device, so long as the devices can be connected to the bridge member. In some aspects, the bridge member can be directly connected to the second sample processing device, or one or more adapters can be utilized to facilitate the connection.

Methods of transporting a fluid sample between a first and second sample processing device are provided herein. A non-limiting exemplary method includes fluidly coupling first and second sample processing devices by coupling an elongate fluidic bridge having one or more fluid channels; and effecting flow of the fluid sample through the fluidic bridge by transmission of an electronic instruction to the first and/or second device. In some aspects, fluid flow through the one or more channels can be effected through pressurization/depressurization or by displacement of the fluid sample by the first or second sample processing devices. It is appreciated that the instruction for transport of the fluid sample through the bridge could be received by either or both of the first and second sample processing device(s). For example, in some embodiments, the fluid channel is depressurized from the second processing device. In some embodiments the motive force can be pressure from first sample processing device and depressurization from the second processing device. It is appreciated that various alternative configurations may be used in providing motive force for transfer of the fluid sample through the bridge with one or both of the first and second sample processing device(s).

In some embodiments, methods include introducing a fluid sample into a fluid sampling device having a fluidic bridge coupled thereto at a first end of the fluidic bridge; selecting a second sample processing device from a plurality of devices; and coupling the second end of the fluidic bridge opposite the first end to the second sample processing device. Such methods can further include performing a first sample processing step in the first sample processing device; transporting the fluid sample from the first sample processing device to the second sample processing device through the fluidic bridge coupled there-between; and performing a second sample processing step within the second sample processing device. In some embodiments, an analysis of the fluid sample can be performed within the second device or the fluid can be transported back to the first sample processing device through the fluidic bridge or transported to yet another device. In some embodiments, the method can include performing an additional sample processing step and/or a sample analysis step while the fluid is transported through or contained within the fluidic bridge. In some embodiments, the fluidic bridge can include one or more sample processing features, such as a filter or pre-amplification chamber. In some embodiments, the fluidic bridge can include, for example, a sample analysis feature, such as a micro-well array, an isoelectric focusing region, or an optical detection window.

In some embodiments, method for processing an unprepared sample can include steps of: receiving a sample processing cartridge at a cartridge receiver, the sample processing cartridge comprising a unprepared fluidic sample to be analyzed, a plurality of processing chambers fluidically interconnected by a moveable valve body; receiving an electronic instruction to process the unprepared sample into a prepared sample from an assay processing device coupled to the cartridge receiver; performing a sample preparation method to process the unprepared sample into the prepared sample. In some embodiments, moving the sample can include steps of: moving a cartridge interface unit to move the valve body to change fluidic interconnections between the plurality of sample processing chambers; applying pressure to a pressure interface unit to move fluid between the plurality of processing chambers according to position of the valve body; and fluidically moving the prepared sample into an elongated fluidic bridge that extends from the sample processing cartridge and fluidically interfaces with the assay processing device to provide the prepared sample to the assay processing device.

In some embodiments, the system comprises a first sample processing device, a second sample processing device, and a fluidic bridge coupleable with each of the first and second sample processing devices so as to facilitate transport of a fluid sample between the first and second sample processing device when coupled therebetween. In some embodiments, the second sample processing device is included within a plurality of sample processing devices selectable by a user, the fluidic bridge being interchangeable between plurality of the sample processing devices. In some aspects, the plurality of sample processing devices, from which the second sample processing device is selected, includes sample processing devices of differing types.

In some embodiments, a system comprises a first sample processing device, a second sample processing device, and a fluidic bridge that includes an elongated bridge and one or more fluid-tight coupling on opposite ends thereof fluidically coupleable with each of the first and second sample processing devices. In some aspects, the elongated bridge includes one or more channels extending between a first end and a second end of the elongated bridge. In some embodiments, the one or more channels do not include a sample preparation chamber. The one or more fluid-tight couplings on either end are adapted for fluidly coupling the one or more fluid channels with the first sample processing device and second sample processing devices at a fluid tight junction so that the first and second sample processing devices are in fluid communication through the one or more channels when the fluidic bridge is coupled to each of the first and second sample processing devices so as to facilitate transport of a fluid sample between the first and second sample processing devices.

DETAILED DESCRIPTION OF THE INVENTION

Figure 1:
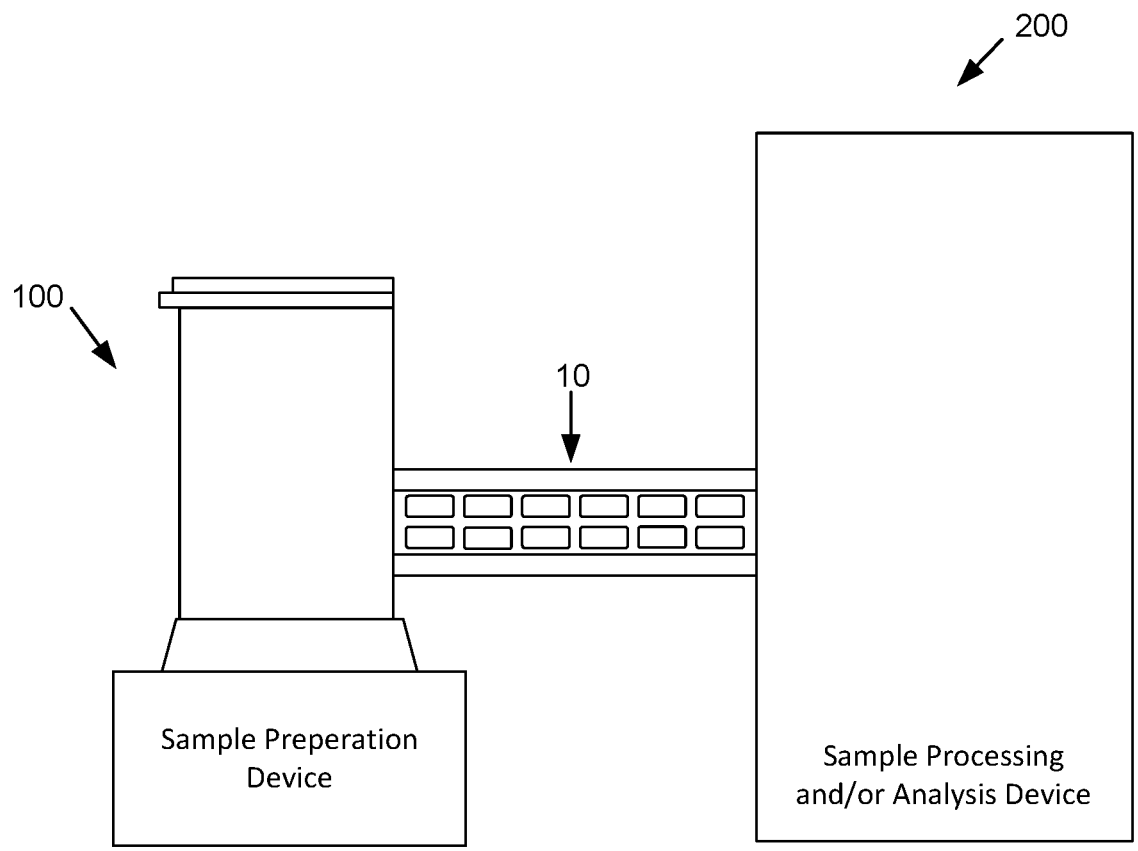
FIG. 1 is an overview of a fluidic bridge device extending between a first sample processing device and a second sample processing/analysis device to facilitate transport of a prepared sample there-between, in accordance with aspects and embodiments of the invention.

The present invention relates generally to system, device and methods for fluid manipulation, in particular, for transport of a fluid sample from a first sample processing device to a second sample processing device by way of a fluidic bridge.

I. Exemplary System Overview

In one aspect, the invention relates to a fluidic bridge having one or more fluid conduits that are fluidly coupleable with each of a first and second fluid sampling device to facilitate transport of a fluid sample through the one or more fluid conduits between the first and second devices. In some embodiments, the first sampling device includes a sample processing cartridge for preparation and/or analysis of a fluid sample and the fluidic bridge fluidly couples with the sample processing cartridge so as to facilitate transport of the prepared fluid sample to the second processing device, which can be any of various devices desired for analyzing biological samples or further processing thereof. In some embodiments, the one or more conduits do not include a sample preparation region. In some embodiments, the fluidic bridge can include a variety of features, such as one or more specific regions, where each region is adapted for a sample processing procedure or a sample analysis procedure. Non-limiting exemplary sample processing procedures can include, filtration, concentration, incubation, chemical treatment and amplification. Additional sample processing procedures suitable for use with the invention are well known to persons of skill in the art. Non-limiting exemplary sample analysis procedures can include, hybridization, optical interrogation, iso-electric focusing, antibody binding and detection (e.g. ELISA), sequencing, chromatography, and lateral flow chromatography. Additional sample analysis procedures suitable for use with the invention are well known to persons of skill in the art. The fluidic bridge can further include one or more features, including filters, traps, membranes, ports and windows, to allow additional processing steps during transport of the fluid sample to the second sample processing device.

A. First Sample Processing Device

The first sample processing device can be any device configured to perform a process step relating to the preparation and/or analysis of a fluid sample according to any of the methods described herein. In some embodiments, the first sample processing device is a sample preparation device configured to prepare a sample for analysis, such as detection of a nucleic acid target in a nucleic acid amplification test (NAAT), e.g., Polymerase Chain Reaction (PCR) assay. Preparation of a fluid sample generally involves a series of processing steps, which can include chemical, electrical, mechanical, thermal, optical or acoustical processing steps according to a specific protocol. Such steps can be used to perform various sample preparation functions, such as cell capture, cell lysis, binding of analyte, and binding of unwanted material. Such a sample preparation device can employ a sample processing cartridge that includes one or more chambers suited to perform the sample preparation steps, such a cartridge is shown and described in U.S. Pat. No. 6,374,684, entitled "Fluid Control and Processing System" filed Aug. 25, 2000, and U.S. Pat. No. 8,048,386, entitled "Fluid Processing and Control," filed Feb. 25, 2002, and are incorporated herein by reference in their entirety for all purposes.

Figure 2A:
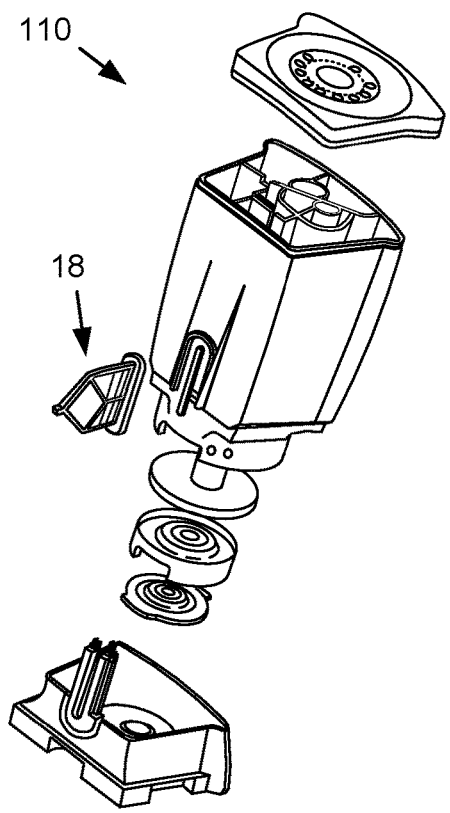
FIGS. 2A-2D illustrates an exemplary sample processing cartridge and an associated reaction vessel for analysis within a conventional sample processing device.
Figure 2B:
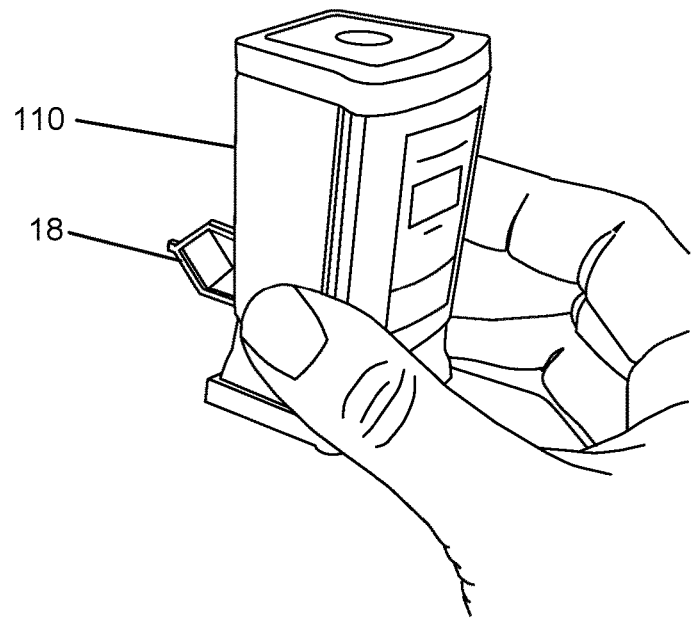
Figure 2C:
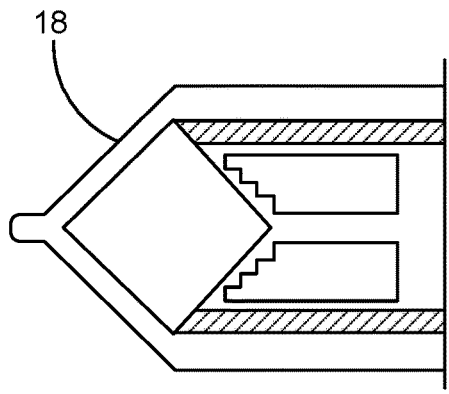
Figure 2D:
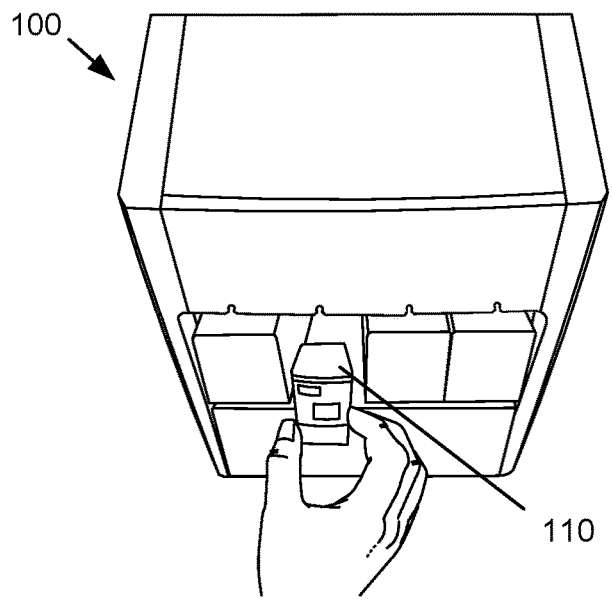

A sample processing cartridge suitable for use with the invention, can include one or more transfer ports through which the prepared fluid sample can be transported into a reaction vessel for analysis. FIGS. 2A-2D illustrate an exemplary sample processing cartridge 110 and associated reaction vessel 18 to allow sample preparation and analysis within a sample processing device 100 that performs both sample preparation and analysis. As can be seen in FIG. 2A, the sample processing cartridge 110 includes various components including a main housing having one or more chambers for sample preparation to which a reaction vessel 18, for sample analysis, is attached. After the sample processing cartridge 110 and the reaction vessel 18 are assembled (as shown in FIG. 2B), a fluid sample is deposited within a chamber of the cartridge and the cartridge is inserted into the sample processing device shown in FIG. 2D. The device then performs the processing steps needed to perform sample preparation and the prepared sample is transfer through one of a pair of transfer ports into fluid conduit of a reaction vessel attached to the cartridge housing. The prepared fluid sample is transported into a chamber of the reaction vessel 18 (see FIG. 2C) while an excitation means and an optical detection means of the device 110 are used to detect optical emissions that indicate the presence or absence of a target nucleic acid analyte of interest, e.g., a bacteria, a virus, a pathogen, a toxin, or other target. It is appreciated that such a reaction vessel could include various differing chambers, conduits, or micro-well arrays for use in detecting the target analyte. An exemplary use of such a reaction vessel for analyzing a fluid sample is described in commonly assigned U.S. Pat. No. 6,818,185, entitled "Cartridge for Conducting a Chemical Reaction," filed May 30, 2000, the entire contents of which are incorporate herein by reference for all purposes.

B. Fluidic Bridge

Figure 3A:
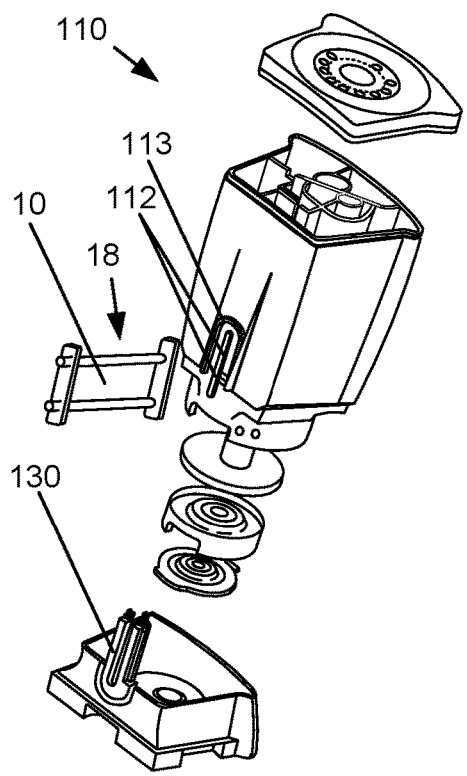
FIGS. 3A-3C illustrate a fluidic bridge for use with a sample processing cartridge to allow transport of the fluid sample from the first sample processing device to a selected second sample processing device, in accordance with aspects and embodiments of the invention.
Figure 3B:
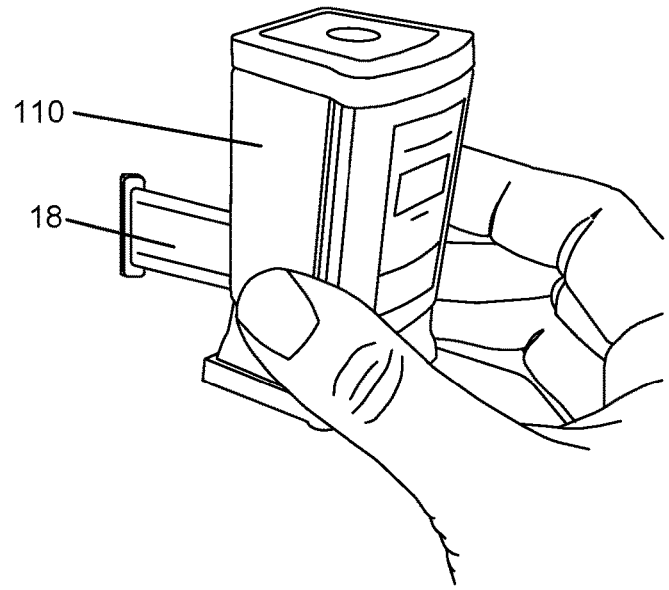
Figure 3C:
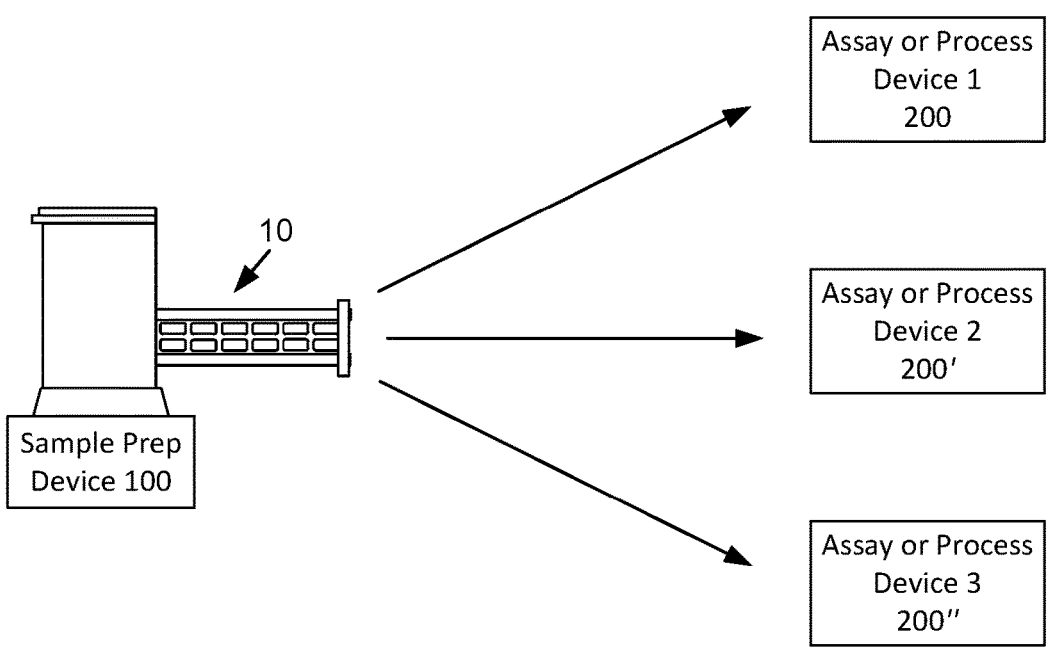

In some embodiments, the invention includes a fluidic bridge that can be fluidically coupled to one or more transfer ports of a sample processing cartridge housing associated with a first sample processing device for use in transporting a prepared fluid sample to a second sample processing device external to the first device. This allows for improved versatility of analysis of the sample as compared to confining processing and analysis of the sample to the functionality associated with a single device. For example, a user may wish to utilize a different device to analyze or perform further processing from the first sample processing device. However, preparation of the sample can be a time consuming and laborious process to perform by hand such that it would be advantageous to perform sample preparation within the first sample preparation device, which can perform the sample preparation steps according to an automated process. This expedites the sample preparation process and allows for high volumes of samples to be prepared. By utilizing a fluidic bridge device instead of the reaction vessel, as shown in FIGS. 3A-3B, the user can utilize the first sample processing device to prepare the sample in a sample processing cartridge 110 and then subsequently transport the prepared sample through the attached fluidic bridge 10 to a selected second device, which can be any of a number of processing devices 200, 200', 200", as shown in FIG. 3B. Such devices can be configured to couple directly to a distal end of the fluidic bridge 10 or can utilize one or more adapters to facilitate fluid-tight coupling between the assay or processing devices and the fluidic bridge 10.

In some embodiments, the fluidic bridge is coupled to each of the first and second sample processing devices at the same time, such that the first device can facilitate transport of the fluid sample through the bridge to the second device. In some embodiments, the fluidic bridge device can be coupled to the first and second devices at different times. For example, a sample cartridge having a fluidic bridge attached thereto can be placed in a sample processing device for preparation of the sample and then removing the sample cartridge, with the fluidic bridge attached, from the first sample processing device, and then attaching the open end of the fluidic bridge to the second sample processing device. Alternatively, the fluidic bridge can be attached to the second processing device and not the first processing device. In such an embodiment, a cartridge containing a prepared sample from the first sample processing device can be removed from the first device and connected to the fluidic bridge which is already attached to the second device. In such embodiments, the second device can be configured to facilitate transport from the cartridge device into the second device.

C. Second Sample Processing Device

The second sample processing device can be any device configured to perform a process step relating to preparation and/or analysis of a fluid sample according to any of the methods described herein, or known to a person of ordinary skill in the art. In some embodiments, the second sample processing device can be internal to or located within a common housing with the first sample processing device. For example, the first and second sample processing devices can be separate and independent modules that are both contained in a larger housing. In some embodiments, the second sample processing device can be a second sample processing cartridge that is configured to perform sample analysis on the prepared sample. In such embodiments, the sample processing cartridge contains the reaction vessel for conducting an analysis on the prepared sample. As above, this system configuration can be used to expedite the processing of a sample from which separate aliquots can be delivered to separate analysis cartridges for interrogating the sample for the presence or absence of different analytes of interest. In some embodiments, the prepared sample can be aliquoted between a second sample preparation device and a third, fourth, fifth, etc. sample preparation device. As above, each of the subsequent devices can be external to the first device, or they can be internal to or located within a common housing with the first device. In some embodiments, the second device is an analysis cartridge to be processed within the first device. In some cases, the prepared sample can be interrogated for nucleic acid, as well as protein. Such analysis would require aliquoting the sample to at least 2 subsequent devices which can each be a sample cartridge. In some embodiments, it can be desirable to determine the presence of a protein and the extent of glycosylation of the protein. In some embodiments, it can be desirable to configure the assay for detection or analysis of a nucleic acid (including methylation status), a protein, a carbohydrate, and or a lipid.

In some embodiments, the second sample processing device is a device that performs sample analysis, such as nucleic acid amplification. Non-limiting exemplary nucleic acid amplification methods suitable for use with the invention include, polymerase chain reaction (PCR), reverse-transcriptase PCR (RT-PCR), Ligase chain reaction, transcription mediated amplification (TMA), and Nucleic Acid Sequence Based Amplification (NASBA). Additional nucleic acid tests suitable for use with the instant invention are well known to persons of skill in the art. Analysis of a fluid sample generally involves a series of steps, which can include optical or chemical detection according to a particular protocol. In some embodiments, the second sample processing device can be used to perform any of the aspects relating to analysis and detection of a target described in U.S. Pat. No. 6,818,185, cited previously and incorporated herein by reference in its entirety.

In some embodiments, the fluidic bridge is an elongated structure having one or more fluid channels or conduits extending between opposite ends to allow a fluid sample to flow distally from a proximal end fluidly coupled with the first sample processing device to the distal end fluidly coupled with the second sample processing device. In some embodiments, the one or more fluid channels have a cross-sectional area that does not substantially vary across the length of the fluid channel between the respective fluid-tight couplings. This allows for more consistent, predictable flow of fluid sample through the channel to allow more control of the fluid transport through the bridge. Fluid transport through the bridge is effected by receiving an electronic instruction by the system, which can include either the first and/or the second sample processing device, to transport the fluid sample after processing with the first sample processing device is complete. Transport of the fluid sample through the one or more fluid channels can be effected by pressurization/depressurization of the channel or by displacement of the fluid. In some embodiments, displacement of the fluid can be effected by displacing air such that displacement of a volume of air results in displacement of an amount of fluid sample. In some embodiments, the amount of fluid displaced is equal to the amount of air displaced. In some embodiments, the amount of fluid displaced is less than the amount of air displaced. For example, in a bridge having at least two fluid channels, feeding air into or evacuating air from one fluid channel can result in transport of the fluid sample into or through the other fluid channel. In some embodiments a bridge member having at least two channels, each of the at least two channels can have a volume that does not substantially differ. In some embodiments, the volumes of the at least two channels can substantially differ according to a pre-determined amount. In some embodiments, configuring the fluid flow channels to be of similar flow dimensions as the fluid channels with the reaction vessel noted above (see U.S. Pat. No. 6,374,684), the same mechanisms by which transport of fluid sample through a reaction vessel can be used to transport fluid sample into the fluidic bridge for transport to a second sample processing device. A person of skill in the art will appreciate that transport of the fluid sample through the bridge can be effected in any number of ways that would be suitable for use with the instant invention.

II. Example Fluidic Bridge Device Constructions

Figure 4A:
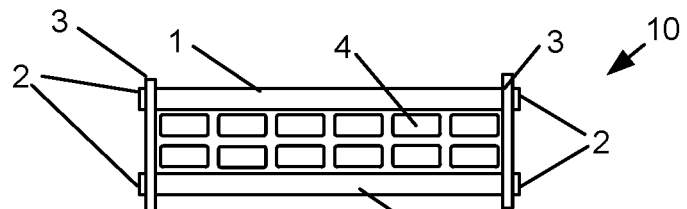
FIGS. 4A-4D illustrates exemplary fluidic bridge devices, in accordance with aspects and embodiments of the invention.

FIGS. 4A-4D depicts exemplary fluidic bridge devices in accordance with embodiments of the invention. As can be seen in FIG. 4A, the fluidic bridge member 10 includes two fluid channels or conduits 1 spaced apart spaced apart from each other and extending the length of the bridge member between opposite ends. The channels are separated and supported by a supporting web structure 4. The fluidic bridge can be fabricated from any material suitable for transport of a fluid sample such that it would not interfere with processing or analysis of the sample, typically an inert plastic or polymer-based material can be used. In some embodiments, the material used to fabricate the fluidic bridge is a transparent or partly translucent material to allow visual observation of sample transport and/or optical detection/monitoring of the fluidic channel through the material.

In some embodiments, each of the one or more channels are through lumens extending from a first fluid-tight coupling at one end and a second fluid-tight coupling at an opposite end of the bridge. The fluidic bridge is only limited in length by the volume of air that can be displaced by the first and/or second sample processing devices to effect fluid transport through the bridge. In some embodiments, the fluidic bridge is 10 or more feet in length. In some embodiments, the length of the fluidic bridge is less than 10 feet in length, for example, the fluidic bridge can have a length of up to 10 feet, 9 feet, 8 feet, 7 feet, 6 feet, 5 feet, 4 feet, 3 feet, 2 feet, or 1 foot. In some embodiments, the length of the fluidic bridge is less than 1 foot. For example, the fluidic bridge can have a length between the stubs of about 30 cm, 29 cm, 28 cm, 27 cm, 26 cm, 25 cm, 24 cm, 23 cm, 22 cm, 21 cm, 20 cm, 19 cm, 18 cm, 17 cm, 16 cm, 15 cm, 14 cm, 13 cm, 12 cm, 11 cm, 10 cm, 9 cm, 8 cm, 7 cm, 6 cm, 5 cm, 4 cm, 3 cm, 2 cm, or 1 cm in length.

In some embodiments, the bridge has a length between 3 to 5 cm, such as about 4 cm between flanges, and the fluid channels extend in parallel and are separated by about 1 cm. This configuration allows for substantially fluid-tight couplings at each end that are of substantially the same construction, such as that shown in FIG. 4A. The fluid-tight couplings of each channel are defined by a stub 2, each stub being dimensioned to be fittingly received in a corresponding external port of the first or second devices so as to facilitate a fluid-tight coupling of the fluid channels 1 with corresponding fluid channels of the respective devices. For example, stubs 2 at the proximal end of the fluidic bridge 10 serve as inlet stubs for flow of the prepared fluid sample into the bridge, while the stubs 2 at the distal end serve as outlet stubs for flow of the fluid sample out from the bridge into the second sample processing device. In some embodiments, the inlet stubs can have an outside diameter between 2-10 mm, for example, the outside diameter can be 2, 3, 4, 5, 6, 7, 8, 9, or 10 mm. Typically, the outside diameter of the stub is about 3 mm, and extends from the flange 3 a distance of about 2-5 mm, such as about 3 mm, so as to facilitate fluid-tight coupling with a sample processing cartridge, such as that shown in FIG. 2A. The inside diameter of each of the one or more channels can be within a range of 1 mm to 5 mm.

In some embodiments, each of the one or more fluid channels is open at each end when the bridge is unattached from the first and second device. In some embodiments, the one or more channels extend directly between the fluid-tight coupling at each end of the fluidic bridge, there being no other inlet or exit port there between, such that fluid flowing into an inlet stub in one side exits the outlet stub on the opposite side. In some embodiments, where each of the one or more fluid channels are open at each end when unattached, the channels lack any sample preparation means, such as any pre-existing reagents or means for binding an analyte of interest contained therein. In some embodiments, the one or more channels extend between fluid-tight couplings without any chambers, valves or ports between the proximal and distal ends. In some embodiments, the fluidic bridge comprises one or more valves, or ports between the proximal and distal ends. In some embodiments, the one or more channels can include one or more chambers or regions, which can be used to process or analyze the fluidic sample. For example, the fluidic bridge can comprise one or more chambers or regions for thermal amplification of nucleic acid in the sample, filtration of the sample, including lateral flow chromatography, hybridization, and or incubation of the sample with one or more assay reagents. In some embodiments where the one or more channels are open to external environment at one end can cause the one or more channels that include one or more chambers unsuitable for use as sample preparation chambers since such sample preparation means cannot be suitably contained within open channels. In some embodiments, each of the one or more fluid channels are closed (sealed) to the external environment through a film seal over the fluid-tight couplings when unattached to the first or second sampling processing devices. In such embodiments, any sample preparation means or assay reagents will be securely contained within the fluidic bridge until attached to the first and/or second processing device, whereby the film seals are broken or removed at the time of connecting the fluidic bridge to said devices.

In some embodiments, the bridge is provided pre-attached to a cartridge of the first device such that the fluid-tight couplings are coupled with one or more corresponding fluid transfer ports of the cartridge while the fluid-tight couplings on the opposite end of the bridge remain open. In some embodiments, the bridge is attached to cartridge of the first device with fluid-tight couplings coupled with one or more corresponding fluid transfer ports of the cartridge while the fluid-tight couplings on the opposite end of the bridge are sealed. In some embodiments, a reagent, means for virus lysis, or means for binding an analyte of interest (e.g. reagent beads) as can be used for sample preparation can be contained within one or more chambers of the cartridge or first device. The bridge allows a user to selectively couple the cartridge or first device to a second sample processing device as desired, which can include various other reagents or various other means of performing additional sample processing. In some embodiments, the fluidic bridge can contain reagents for sample processing and each of the ends are sealed until connected to the respective first and second sample processing devices.

In some embodiments, each conduit of the fluidic bridge 10 can include a flange 3 at one or both ends that extends circumferentially about the bridge for use in attaching the fluidic bridge to the sample processing cartridge and or the second sample processing device. While the fluid tight coupling shown in FIG. 5A includes stubs 2 extending from a flange 3, it is appreciated that various other fluid-tight couplings suitable for use with the invention can be devised and that the fluid-tight couplings at each end can differ from one another as needed to fluidly couple with particular types of devices. Non-limiting exemplary fluid type couplings suitable for use with the invention, include, Luer-lock connections, snap-fit connections, friction fittings, click-fit connections, and screw-on connections. Additional types of fluid tight couplings suitable for use with the invention are well known to persons of skill in the art. In some embodiments, the fluidic bridge can include one or more adapters that facilitate connection of the fluidic bridge having a first type of fluid-tight coupling with a fluid sample processing device having another type of fluid-tight coupling. A non-limiting exemplary adapter to facilitate connection of the fluidic bridge is shown in FIG. 4A.

Figure 4B:
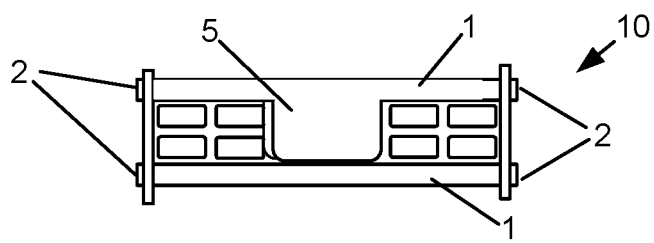
Figure 4C:
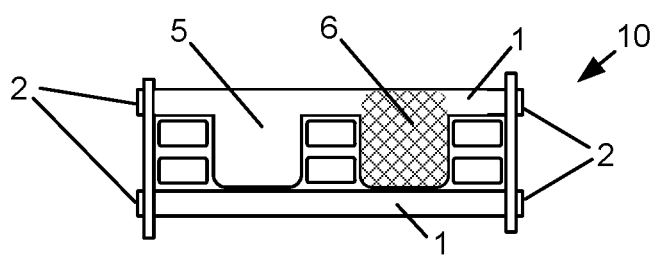

In some embodiments, the fluidic bridge 10 can include one or more processing features in fluid communication with one or more of the fluid flow channels, e.g. as shown in FIG. 4B. In some embodiments, the fluidic bridge can include one or more processing features, including one or more chambers, filters, traps, membranes, ports and windows, to allow additional processing steps during transport of the fluid sample to the second sample processing device. For example, as shown in FIG. 4B, the fluidic bridge can include a chamber 5, which can be used, e.g., as an amplification chamber to perform nucleic acid amplification. Additional uses for chamber 5 will be apparent to one of ordinary skill in the art, and can include filtration, chromatography, hybridization, incubation, chemical treatment, e.g., bisulfite treatment and the like. The chamber 5 allows for accumulation of a portion of the fluid sample for further processing or analysis as needed for a particular protocol. In some embodiments, the chamber comprises a window that is at least partly transparent, such as the transparent microarray reaction chamber shown in FIG. 4C, which allows for optical detection of an analyte of interest in the fluid sample through the chamber during transport of the fluid sample through the bridge. This feature is particularly advantageous when screening for the presence or absence of multiple analytes, or for an analysis that may require several detection steps or require further processing and/or analysis of the fluid sample after detection of a particular target or analyte of interest.

Figure 4D:
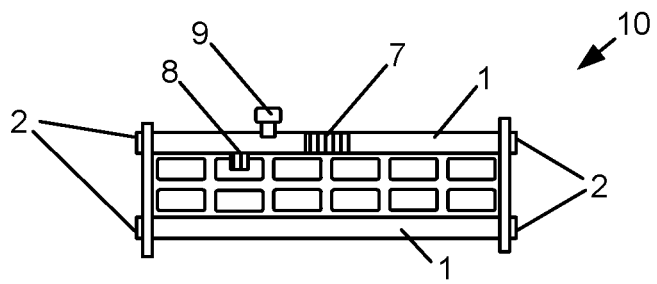

In some embodiments, one or more additional features can be incorporated into the fluidic bridge. Non-limiting exemplary additional features that can be incorporated into the fluidic bridge are shown in FIG. 4D. These features can include a filter 7, a bubble trap or gas permeable vent 8, and an external port 9. In some embodiments, a solid phase material, e.g., a filter 7 can be positioned to capture components (e.g., cells, spores, microorganisms, viruses, nucleic acids, proteins, lipids, carbohydrates, or the like) from the fluid sample as it passes there through. The solid phase material can be formed of a screen, mesh, membrane, or comprised of a chromatography column, or other structure suitable for use in filtering or concentrating the sample. A bubble trap or gas permeable vent 8 can be used to substantially eliminate any gas or air bubbles that may form in the fluid channel during transport of the fluid sample. The external port 9 on the fluidic bridge can be used to access the fluid flow channel as needed, for example, the external port can be used to deposit a substance within the fluid flow channel or within a chamber of the fluidic bridge as needed for a particular protocol. In some embodiments, the external port of the fluidic bridge can be used to remove an aliquot of the processed sample as it flows through the bridge. The external port can also be used to facilitate flow of the fluid sample along various other paths, for example, another bridge can be connected to the external port 9 so that the fluid sample can be concurrently directed along multiple paths to differing devices to facilitate analysis for different targets at the same time. In some embodiments, this approach can be employed by using a fluidic bridge in which one or more of the fluid flow paths split into multiple fluid flow channels. In some embodiments, a valve is added as an additional feature. It is appreciated that each of the features illustrated in FIGS. 4A-4D can be used in any number or combination within a fluidic bridge device 10 in accordance with the invention described herein.

III. Fluidic Interface Between Fluidic Bridge and Processing Devices

Various aspects of the sample processing cartridge 110 shown in FIGS. 2A-2D and 3A-3C can be further understood by referring to U.S. Pat. No. 6,374,684, which described certain aspects of a sample processing cartridge in greater detail. Such cartridge devices include a fluid control device, such as a rotary fluid control valve that is connected to the chambers of the cartridge. Rotation of the rotary fluid control valve permits fluidic communication between chambers and the valve so as to control flow of a sample deposited in the cartridge into different chambers in which various compounds can be provided according to a particular protocol as needed to prepare the sample for analysis. To operate the rotary valve, a motor such as a stepper motor is typically coupled to a drive train that engages with a feature of the valve to control movement of the valve and resulting movement of the fluid sample according to the desired sample preparation protocol. The fluid metering and distribution function of the rotary valve according to a particular sample preparation protocol is demonstrated in U.S. Pat. No. 6,374,684, which is incorporated herein for all purposes.

Figure 5A:
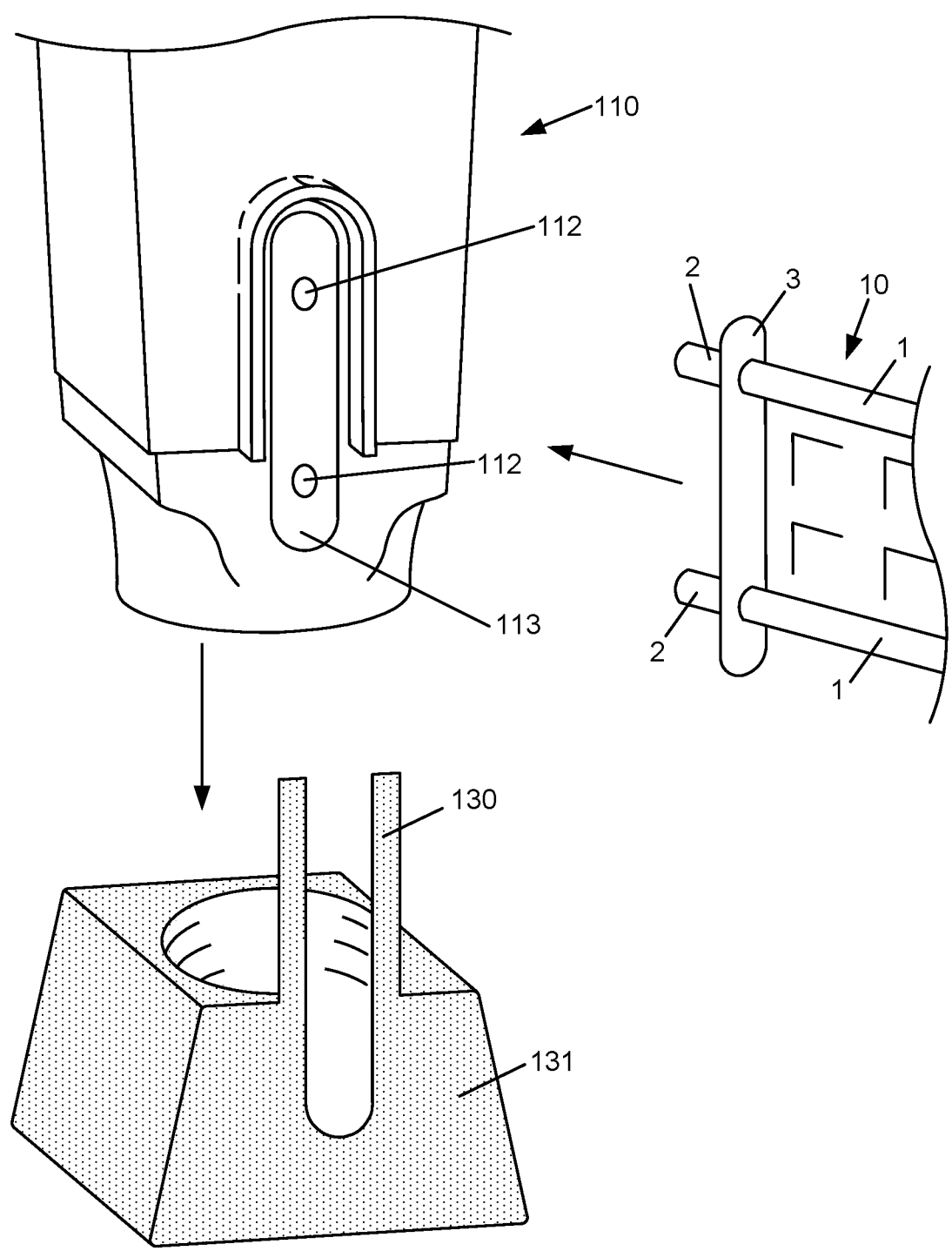
FIGS. 5A-5B illustrates an exemplary fluid-tight coupling between a fluidic bridge and a sample processing cartridge system according to an embodiment of the present invention.
Figure 5B:
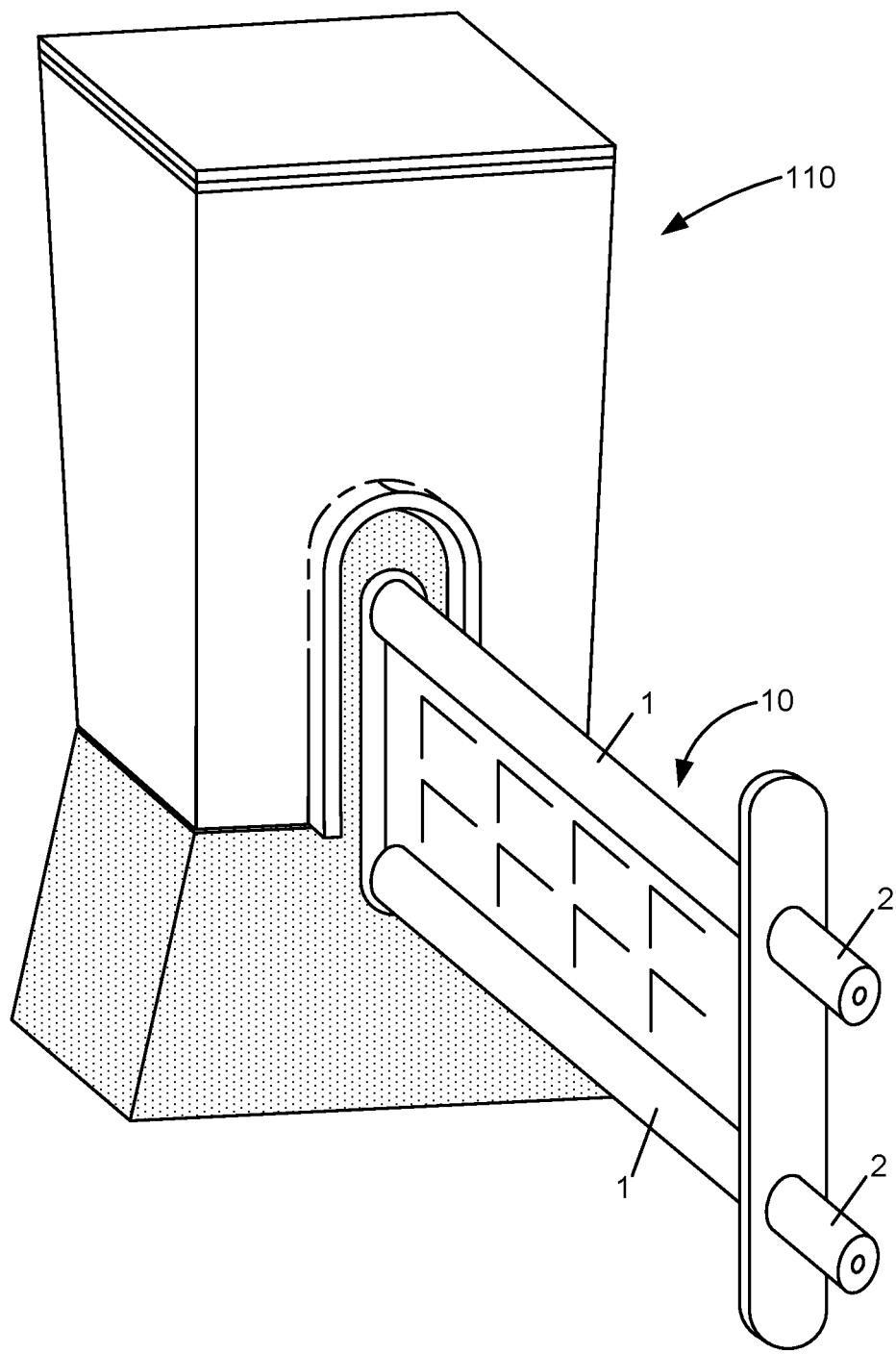

In some embodiments, the sample processing cartridge 110 includes two transfer ports to facilitate flow of the fluid sample through the reaction vessel 18. In the embodiment shown in FIG. 5A, the fluidic bridge includes two fluid flow channels having corresponding inlet stubs 2 that are dimensioned and spaced apart so as to be fittingly received within the two transfer ports 112 of the sample processing cartridge. A sealing gasket 113 can surround the transfer ports 112, one or both of which can be formed of an elastomeric material so as to facilitate fluid-tight sealing of the inlet stubs 2 within the transfer ports. The flange 3 may be dimensioned so that a proximal facing surface of the flange engages a gasket 113 extending about the transfer ports of the first sample processing device while a retaining member 130 of the first sample processing device engages a distal facing surface of the flange, thereby ensuring a fluid-tight coupling of each of the one or more fluid channels with the first and/or second sample processing device. In some embodiments, such as shown in FIG. 5A-5B, the retaining member 130 is incorporated into a base 131 of the sample processing cartridge on which the main body cartridge is mounted, such that the fluidic bridge 10 can be attached and fluidly coupled to the sample processing cartridge during assembly and provided to a user in an assembled condition, as shown in FIG. 5B. In some embodiments, the sample processing cartridge includes at least two transfer ports 112 to which the fluidic bridge device 10 fluidly couples for transport of the processed sample from the cartridge system 110 to a second fluid processing device. In some embodiments, the sample processing cartridge can have only one external transfer port, in which case, the corresponding fluidic bridge for use with said cartridge will comprise a single fluid channel.

In some embodiments, the fluidic bridge comprises a sample preparation device having the sample processing cartridge described above. In some embodiments, the fluidic bridge is configured according to the particulars of various other types of sample processing devices in any number of ways to provide the advantageous aspects of the fluidic bridge member described herein. For example, the distal end of the fluidic bridge that connects to the second sample processing device can be specifically configured to interface with a particular device. Such particular features can include the number of transfer ports that the bridge interfaces with, the shape and/or size of the stub, the type of connection, and the like.

Figure 6:
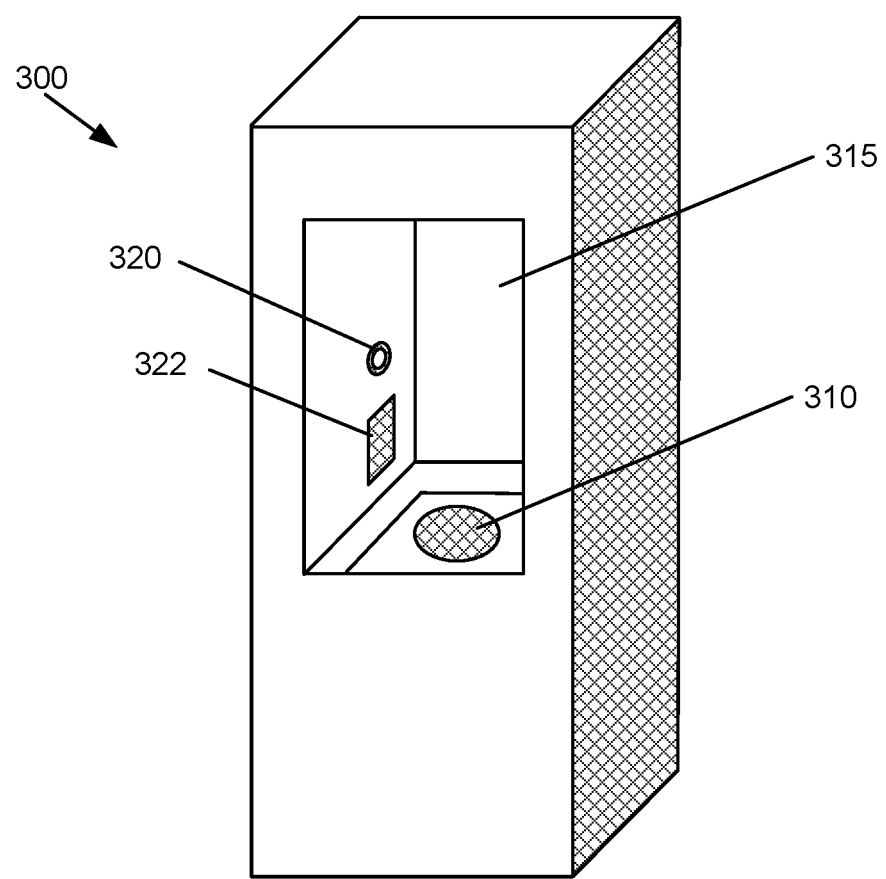
FIG. 6 illustrates a sample processing device adapted for use with a sample cartridge and the fluidic bridge to facilitate transport of a fluid sample to an external processing and/or analysis device, in accordance with aspects and embodiments of the invention.

In some embodiments, the invention can include a first sample processing device that is modified to allow sampling preparation and analysis within the first sample processing device or sample preparation with the device and transport of the prepared fluid sample to a second device through the fluidic bridge while the sample processing cartridge is mounted in the first device. An example of such a modified first sample processing device is shown in FIG. 6. The first sample processing device 300 includes a mechanism 310 that engages with a valve of the sample processing cartridge to facilitate processing by moving the fluid sample into the various chambers of the main body of the cartridge according to the protocol desired for preparation of the sample. The device can further include an optical interrogation means for interrogating the sample as to the presence or absence of a particular analyte.

In some embodiments, the optical interrogation means involve an optical excitation means 320, typically an LED device, to excite fluorescent moieties on probes hybridized to the target of interest, and a detection means 322 for detecting fluorescence emitted from said probe when bound to target being indicative of the presence of the target for which the sample is being analyzed. While in FIG. 6, the optical excitation means 320 and detection means 322 are shown as being disposed on a sidewall of the passage 315 in which the sample cartridge resides, it is understood that these elements can be positioned in various other locations so long as the fluid sample is sufficiently accessible to the excitation means and detections means to allow excitation and detection of the analyte. For example, the excitation means and detection means could be incorporate into a bottom surface or upper surface of the passage 315, or may be included in an entirely different component that is separate from, detachable or movable relative an external housing of the first sample processing device. These features allow for analysis of a sample in a conventional sample processing cartridge with a conventional reaction vessel 18 or preparation of the sample in the first modified processing device 300 and subsequent transport to a second processing device using the fluidic bridge 10. In such embodiments, it may be necessary to relocate the transfer ports on the sample processing cartridge to accommodate both the reaction vessel and the fluidic bridge. In some embodiments, upon completion of the preparation and analysis in the first device, the sample can be drawn back from the reaction vessel into one of the chambers of the cartridge, then the reaction vessel can be replaced with the fluidic bridge and then the sample can be transferred to the second sample processing device as described herein.

Figure 7A:
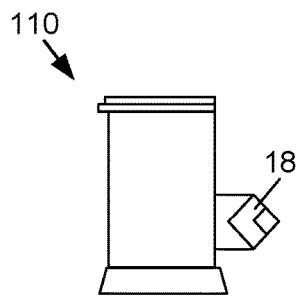
FIGS. 7A-7B illustrates an exemplary sample cartridge and use of the cartridge within the sample preparation and analysis device in FIG. 6, respectively.
Figure 8A:
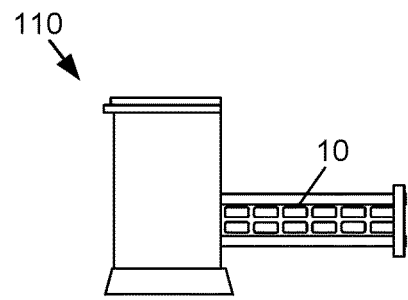
FIGS. 8A-8B illustrates an exemplary sample processing cartridge with a fluidic bridge to facilitate transport of a fluid sample prepared in the cartridge to a second sample processing device, in accordance with aspects and embodiments of the invention.
Figure 7B:
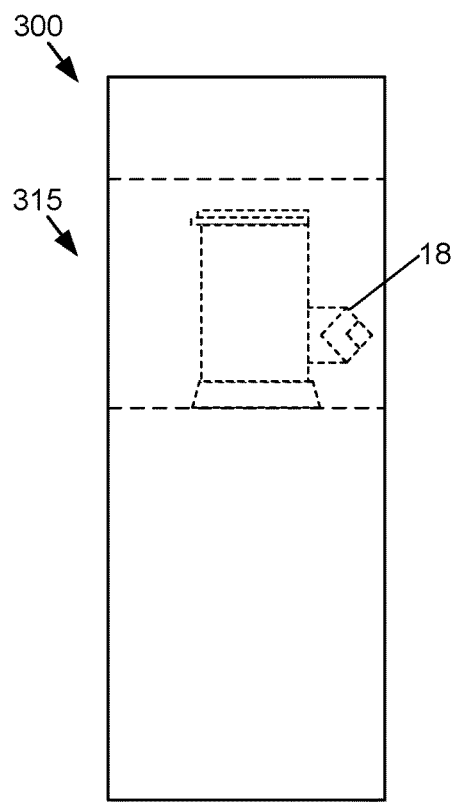
Figure 8B:
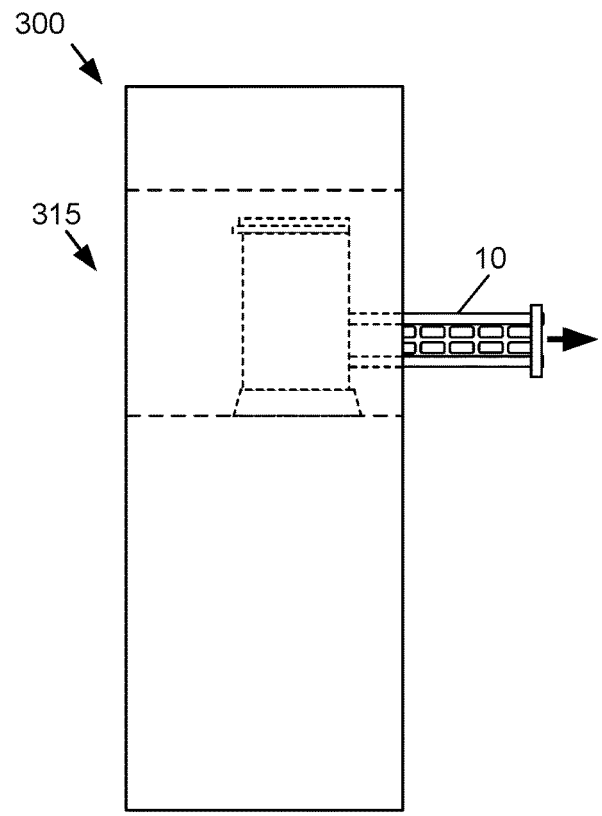

FIGS. 7A-7B and 8A-8B illustrate use of an alternative sample processing cartridge device 300 shown in FIG. 6 with a sample processing cartridge having a reaction vessel 18 as well as use of the device 300 with a sample processing cartridge having a fluidic bridge attached, such as that shown in FIG. 4A. The device 300 includes a passageway or pass-through to allow the fluidic bridge 10 to extend outside the device 300 to facilitate coupling with a second device and transport thereto. As shown in FIG. 7A, the modified sample processing device allows a conventional sample processing cartridge device to be insert and processed from sample preparation to analysis. As shown in FIG. 7B, the modified device 300 when used with a sample processing cartridge having a fluidic bridge device 10 attached thereto, allows the first device 300 to be used for only sample preparation, if a user desired, and transport to a second device for processing and analysis. Towards these ends, it is desirable for the fluidic bridge to have a length of at least two centimeters, preferably at least four centimeters in length, although various other lengths beyond four centimeters could be realized within the scope of the invention.

IV. Methods of Use

In one aspect, methods of transporting a fluid sample between a first sample processing device and a second sample processing device by use of a fluidic bridge are provided herein. Such a fluidic bridge can be configured according to various dimensions and length so as to facilitate transport of a fluid sample from a first sample processing device, such as the sample processing cartridge described herein, to a selected second sample processing device, which can include various different types of processing and/or analysis devices. In certain assays where no sample processing is required beyond that provided by the first sample processing device, an assay analysis device can be coupled (directly or indirectly) to the end of the bridge opposite of the end attached to the first sample processing device. For example, a reaction vessel, a microarray device, or a biosensor device could be attached to the second end of the bridge. In certain other assays, it may be desired to perform additional processing steps (e.g. amplification, filtering, etc.) or to perform an analysis provided by a second sample processing device that is more extensive or complex than that provided by a typical reaction vessel.

Figure 9:
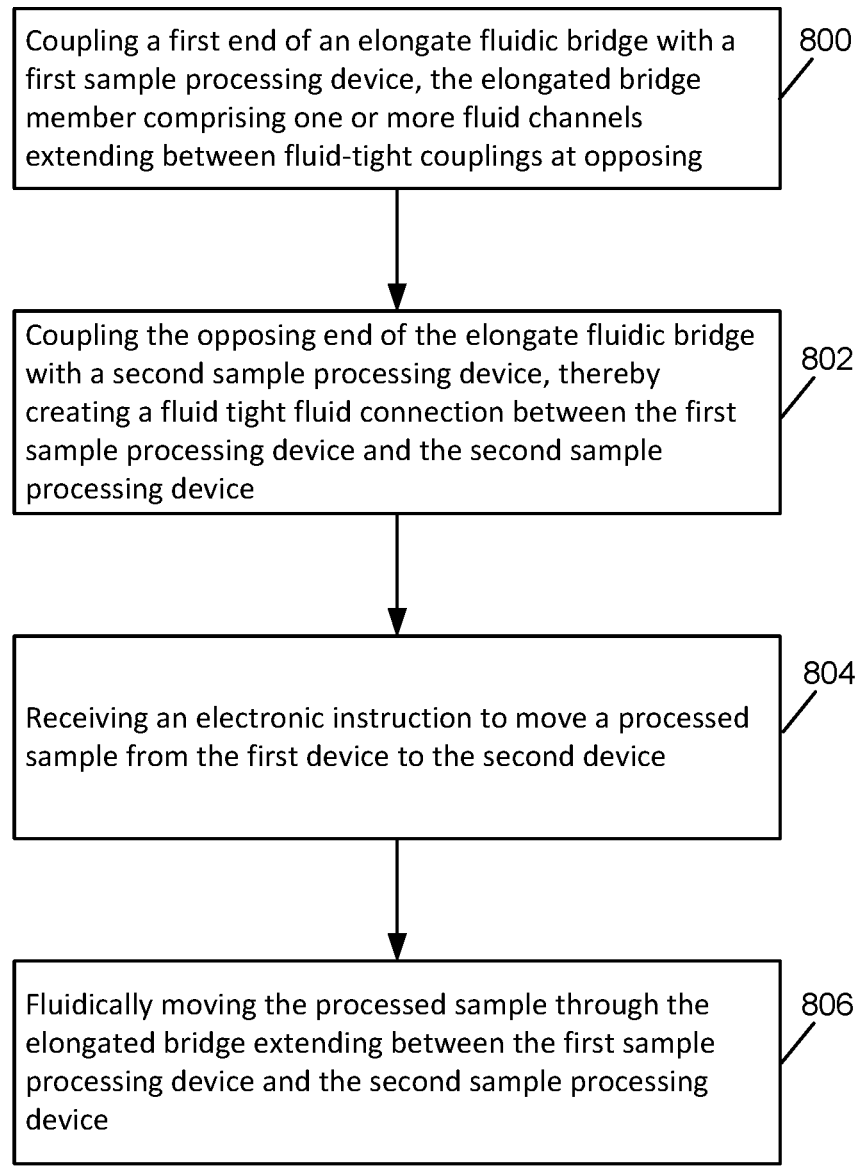
FIGS. 9-10 depict methods of transporting a fluid sample between a first sample processing device and a second sample processing device, in accordance with aspects and embodiments of the invention
Figure 10:
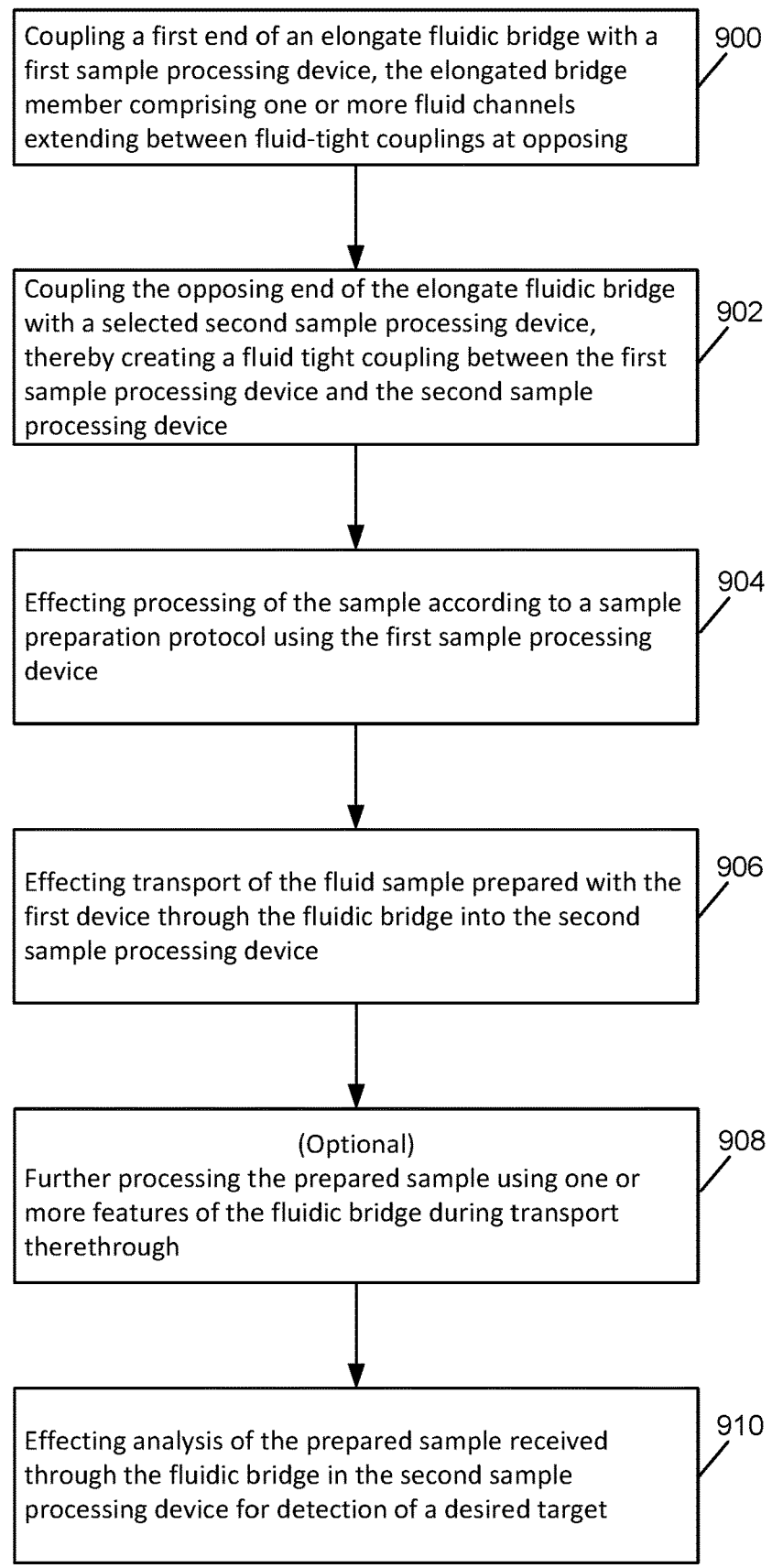

FIGS. 9-10 depict exemplary methods in accordance with embodiments of the invention. The method illustrated in FIG. 9 includes steps of: coupling a first end of a fluidic bridge with a first sample processing device, the bridge member comprising one or more fluid channels extending between fluid-tight couplings at opposing ends 800; coupling the opposing end of the fluidic bridge with a second sample processing device, thereby creating a fluid tight coupling between the first sample processing device and the second sample processing device 802; receiving an electronic instruction to move a processed sample from the first device to the second device 804; and fluidically moving the processed sample through the elongated bridge extending between the first sample processing device and the second sample processing device 806. In some embodiments, the first sample processing device comprises a sample preparation device while the second device may be used to perform analysis of the sample to detect a desired target or for further processing of the prepared sample.

In some embodiments, fluidically moving the processed sample through the elongated bridge is effected by either or both of the first and second sample processing device, typically, upon receiving an electronic instruction to transport the processed sample. Transport of the sample may be effected by pressurization or de-pressurization of at least one of the one or more channels so as to effect fluid flow of the sample from the first processing device through a fluid channel of the bridge and to the second sample processing device. For example, in a bridge member having a pair of fluidic channels that form a fluid circuit when attached to corresponding fluid transfer ports of the first and second sample processing device, air can be withdrawn from one fluid channel of the bridge by the first or second device, thereby causing fluid sample to be drawn from a chamber of the first sample processing device and through the other fluid channel of the bridge before flowing into the second sample processing device.

The exemplary method as illustrated in FIG. 9 includes steps of: coupling a first end of an elongate fluidic bridge with a first sample processing device, the elongated bridge member comprising one or more fluid channels extending between fluid-tight couplings at opposing ends 900; coupling the opposing end of the elongate fluidic bridge with a selected second sample processing device, thereby creating a fluid tight coupling between the first sample processing device and the second sample processing device 902; effecting processing of the sample according to a sample preparation protocol using the first sample processing device 904; effecting transport of the fluid sample prepared with the first device through the fluidic bridge into the second sample processing device 906; optionally further processing the prepared sample using one or more features of the fluidic bridge during transport there through 908; and effecting analysis of the prepared sample received through the fluidic bridge in the second sample processing device for detection of a desired target 910. Further processing of the prepared sample by one or more features in the bridge can include filtering or concentrating utilizing a filter or other suitable solid phase material or membrane, amplification using one or more amplification chambers, chemical treatment utilizing one or more chambers or regions, or removal of accumulated gas or air through a gas permeable membrane or a bubble trap.

Figure 11A:
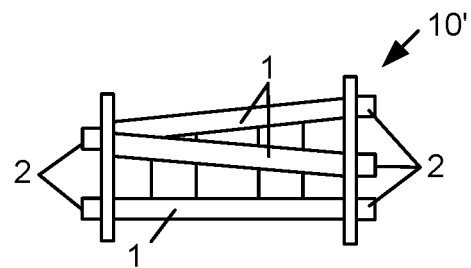
FIGS. 11A-11E depict alternative embodiments of a fluidic bridge device in accordance with aspects and embodiments of the invention.
Figure 11B:
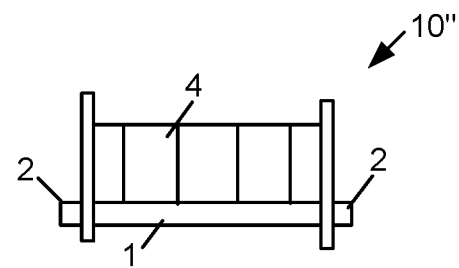
Figure 11C:
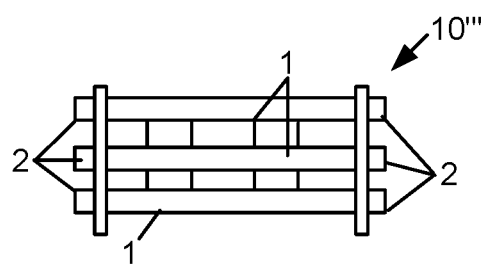
Figure 11D:
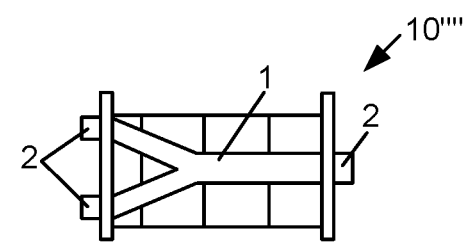
Figure 11E:
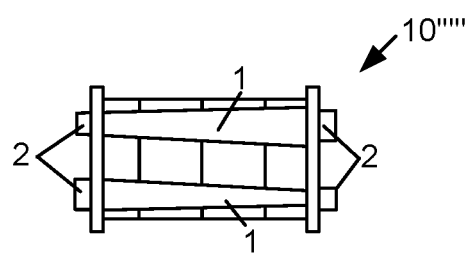

FIGS. 11A-11E depict alternative embodiments of a fluidic bridge device in accordance with various aspects of the invention. FIG. 11A illustrates fluidic bridge 10' in which one fluid conduit or channel 1 splits into two fluid channels. As can be seen, upper inlet stub 2 feeds a fluid channel that splits into two separate channels 1 feeding two separate outlet stubs 2. The lower channel 1 remains a single channel extending between inlet stud 2 to outlet stub 2. It is appreciated that the split channels could also be configured to extend to two different interfaces so as to be attachable to a second and third device concurrently. FIG. 11B illustrates fluidic channel device 10" which includes a single fluid channel 1 extending between inlet stub 2 to outlet stub 2. Such an embodiment could include an additional feature, such as a faux upper stub, to allow the fluidic bridge 10" to be secured to a conventional device having two interfacing ports. Fluidic bridge 10″ further includes structural webbing 4 to maintain rigidity of such an embodiment. FIG. 11C illustrates an embodiment having more than two fluid channels. As can be seen, fluidic bridge 10‴ includes three separate fluid channels 1 extending between corresponding inlet and outlet stubs 2. FIG. 11D illustrates fluidic bridge 10″″ in which two separate inlet stubs 2 feed two fluid channels that combine into a single fluid channel 1 that exits at outlet stub 2. FIG. 11E illustrates fluidic bridge 10″‴ which includes fluid channels 1 that vary in diameter between the inlet and outlet stubs 2. As can be seen, upper channel 1 increases in cross-section from inlet stub 2 before exiting at outlet stub 2. In this embodiment, outlet stub 2 is larger than inlet stub 2, but in other embodiments, outlet stub 2 can be the same size as inlet stub 2. Lower channel 1 also varies in size, the cross-sectional area decreasing between inlet stub 2 to a smaller outlet stub 2. Similarly, inlet and outlet stubs in lower channel 1 can be the same or differing sizes. These features can be used to change the speed at which the fluid sample exits the outlet stubs of the fluidic bridge. In some embodiments, the increase in diameter of one channel can correspond to the decrease in diameter of the other channel such that that the total fluid exchange remains substantially the same as in a fluidic bridge device having fluid channels of the same non-variable diameter. It is appreciated that any of the features described herein could be modified and/or combined in a fluidic bridge device according to various other combinations as desired for a particular application.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A disposable cartridge for processing a single fluid sample obtained for biological analysis, the cartridge comprising:
    a plurality of chambers contained within a housing, the chambers being fluidically interconnected by a moveable valve body comprising one or more fluid processing regions, wherein at least one of the fluid processing regions is configured for sample preparation; and
    a fluidic bridge that is elongated along a length greater than a width, extending from the housing of the cartridge and having fluid-tight couplings on both opposing ends for forming a fluid tight junction with the cartridge and another device, the fluidic bridge having one or more fluid channels extending in a lengthwise direction between the first and second ends and adapted for transport of fluid into or out of the cartridge, wherein the elongated fluidic bridge is of a sufficient length to extend outside a cartridge receiver device configured to receive the disposable cartridge for processing a sample to allow transport of the processed sample to another separate and independent device, wherein the fluidic bridge is configured for transporting a discrete amount of fluid sample obtained for biological analysis between the first and second device each configured for processing the fluid sample to facilitate biological analysis.

2. The disposable cartridge of claim 1, wherein the fluidic bridge is of sufficient length and dimension such that when coupled with the cartridge, when the cartridge is disposed within a cartridge receiver during sample preparation, the fluidic bridge extends through a passageway of the cartridge receiver to facilitate transport of the prepared sample from the cartridge to an assay processing device or an associated component.

3. The disposable cartridge of claim 1, wherein the fluidic bridge comprises at least two fluid channels separated by a supporting web structure or ribs.

4. The disposable cartridge of claim 1, wherein the fluidic bridge further comprises at least one sample processing chambers including an amplification chamber.

5. A module for performing sample preparation, the module comprising:
    a sample processing cartridge configured to hold a single unprepared fluid sample obtained for biological analysis, the sample processing cartridge comprising a plurality of processing chambers fluidically interconnected by a moveable valve body;
    a cartridge receiver adapted to receive and removably couple with the sample processing cartridge and interface with a separate and independent assay processing device, wherein the cartridge receiver includes:
        a cartridge interface unit configured for moving the valve body to change fluidic interconnections between the plurality of sample processing chambers,
        a pressure interface unit for applying pressure to move fluid among the plurality of processing chambers according to position of the valve body, and
        a sample preparation controller configured to electronically communicate with the assay processing device and configured to control the cartridge interface unit and pressure interface unit to process the unprepared sample into a prepared sample within the sample processing cartridge; and
    a fluidic bridge that is elongated along a length greater than a width and coupleable with the sample processing cartridge, the fluidic bridge being of sufficient length to extend outside the cartridge receiver and having one or more fluid channels extending in a lengthwise direction between the first and second ends through which the sample processing cartridge and assay processing device are fluidly coupled to facilitate transport of the prepared sample to the assay processing device, wherein the fluidic bridge is configured for transporting a discrete amount of fluid sample for biological analysis between the first and second device each configured for processing the fluid sample to facilitate biological analysis.

6. The module of claim 5, wherein the cartridge receiver includes a passageway through which the fluidic bridge extends when coupled with the sample processing cartridge when coupled within the cartridge receiver to facilitate transport of the prepared sample from the cartridge receiver to the assay processing device.

7. The module of claim 5, wherein the fluidic bridge comprises only two fluid channels separated by a supporting web structure or ribs.

8. The module of claim 5, wherein the fluidic bridge is greater than two inches in length so as to extend a distance away from the cartridge receiver.

9. A system comprising:
a first sample processing device configured for processing a fluid sample obtained for biological analysis;
a second sample processing device, wherein the second sample processing device is separate and independent from the first sample processing device, wherein the second sampling processing device is configured for further processing of the fluid sample obtained for biological analysis; and
wherein the first sample processing device and the second sampling processing device is separate and independent from the fluidic bridge;
a fluidic bridge coupleable with each of the first and second sample processing device so as to facilitate transport of a fluid sample between the first and second sample processing device when coupled therebetween
wherein the fluidic bridge is elongated and extends a sufficient length such that the fluidic bridge extends outside the first sample processing device and to the second sample processing device, wherein the fluidic bridge is configured for transporting a discrete amount of fluid sample for biological analysis between the first and second device each configured for processing the fluid sample to facilitate biological analysis.

10. The system of claim 9, further comprising a plurality of sample processing devices that include the second sample processing device, and wherein the fluidic bridge is configured to fluidically couple with any of the sample processing devices such that the second sample processing device is selectable from the plurality of sample processing devices.

11. The system of claim 10, wherein the plurality of sample processing devices includes differing types of sample processing devices.

12. The system of claim 9, wherein the fluidic bridge comprises:
one or more fluid channels not including a sample preparation chamber, the one or more channels extending between a first end of the fluidic bridge and a second end opposite the first end;
one or more fluid-tight couplings on the first end adapted for fluidly coupling the one or more fluid channels with a first sample processing device at a fluid tight junction, and
one or more fluid-tight couplings on the second end of the fluidic bridge adapted for fluidly coupling the one or more channels with a second sample processing device so that the first and second sample processing devices are in fluid communication through the one or more channels when the fluidic bridge is coupled to each of the first and second sample processing devices.

13. The system of claim 12, wherein the one or more fluid-tight couplings on each of the first end and the second end of the fluidic bridge comprise only two-fluid tight couplings comprising an inlet and an outlet, wherein the one or more channels comprise two channels extending between the inlet and the outlet of the first end and the second end.

14. The system of claim 9, further comprising:
an adapter configured to facilitate fluidic coupling between the second end of the fluidic bridge and the second device.

* * * * *